(12) United States Patent
Friedlander et al.

(10) Patent No.: US 8,447,273 B1
(45) Date of Patent: May 21, 2013

(54) HAND-HELD USER-AWARE SECURITY DEVICE

(75) Inventors: Robert R. Friedlander, Southbury, CT (US); James R. Kraemer, Santa Fe, NM (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/345,932

(22) Filed: Jan. 9, 2012

(51) Int. Cl.
*H04M 1/66* (2006.01)

(52) U.S. Cl.
USPC ........ 455/411; 455/456.5; 382/128; 382/115; 382/116; 713/186

(58) Field of Classification Search
USPC ............... 455/411, 456.5, 380, 379; 382/115, 382/116, 128; 380/30, 28, 270, 251; 235/380, 235/382, 375; 726/4; 340/5.52, 5.74; 713/186, 713/184, 175; 379/88.02, 221.08
See application file for complete search history.

(56) References Cited

U.S. PATENT DOCUMENTS

| | | | | |
|---|---|---|---|---|
| 4,529,870 | A * | 7/1985 | Chaum | 235/380 |
| 5,513,272 | A * | 4/1996 | Bogosian, Jr. | 382/116 |
| 5,705,993 | A * | 1/1998 | Alesu | 340/5.86 |
| 6,317,544 | B1 * | 11/2001 | Diehl et al. | 385/115 |
| 6,983,882 | B2 * | 1/2006 | Cassone | 235/382 |
| 2003/0031321 | A1 * | 2/2003 | Mages | 380/270 |
| 2004/0109588 | A1 * | 6/2004 | Houvener | 382/116 |
| 2004/0218451 | A1 | 11/2004 | Said et al. | |
| 2005/0030939 | A1 | 2/2005 | Roy et al. | |
| 2005/0273626 | A1 | 12/2005 | Pearson et al. | |
| 2007/0155366 | A1 | 7/2007 | Manohar | |
| 2007/0174633 | A1 * | 7/2007 | Draper et al. | 713/186 |
| 2007/0245158 | A1 | 10/2007 | Giobbi et al. | |
| 2009/0119742 | A1 | 5/2009 | Graziani et al. | |
| 2009/0204815 | A1 | 8/2009 | Dennis et al. | |
| 2009/0327131 | A1 | 12/2009 | Beenau et al. | |
| 2009/0327144 | A1 | 12/2009 | Hatter et al. | |
| 2010/0215223 | A1 | 8/2010 | Abe | |
| 2010/0291909 | A1 * | 11/2010 | Nagaraja | 455/415 |
| 2012/0203906 | A1 * | 8/2012 | Jaudon et al. | 709/225 |

FOREIGN PATENT DOCUMENTS

| | | |
|---|---|---|
| EP | 1696302 A1 | 8/2006 |
| EP | 2083399 A1 | 1/2008 |
| GB | 2435161 A | 8/2007 |
| WO | 2007/071288 A1 | 7/2007 |
| WO | 2008/140554 A1 | 11/2008 |
| WO | 2008/155447 A1 | 12/2008 |
| WO | 2011/019996 A1 | 2/2011 |
| WO | 2011/043772 A1 | 10/2011 |

OTHER PUBLICATIONS

Burnside, M. et al. "The Untrusted Computer Problem and Camera-Based Authentication" (Mar. 11, 2002).

Duc et al., "Human Authentication Protocol for Distributed Computing Environment" (Aug. 2006).

P.S. Aleksic, A.K. Katsaggelos, "Audio-Visual Biometrics," IEEE Proceedings, vol. 94, No. 11, 2025-2044, (Nov. 2006).

(Continued)

*Primary Examiner* — Mahendra Patel

(74) *Attorney, Agent, or Firm* — Weitzman Law Offices, LLC

(57) ABSTRACT

A device and method is described that can be used to provide for various levels of security authentication of a user based upon stored rules applied to results of a combination of biometric and other sensor-derived information.

20 Claims, 3 Drawing Sheets

OTHER PUBLICATIONS

Polon, "Attestation-Based Remote Biometric Authentication," MS Thesis, Clemson Univ. (May 2007).

"Design for All," Final Report ICTSB Project Team (May 15, 2000), pp. 9-1 thru 9-15, 10-1 thru 10-20, 11-1 thru 11-17, 13-1 thru 13-22 and 16-1 thru 16-5.

von Gerrit Bleumer, "Secure Offline Legitimation Systems," University of Dortmund, Thesis (Oct. 19, 2001), pp. 5 thru 11, 59 thru 92 and 164 thru 167.

David C. Hitchcock, Evaluations and Communications of Biometric Authentication Systems, MS Thesis, Univ. Florida (Dec. 2003), pp. 11 thru 69 and 100-127.

Katina Michael, "The technological trajectory of the automatic identification industry: the application of the systems of innovation (SI) framework for the characterisation and prediction of the auto-ID industry," PhD Thesis, Univ. Of Wollongong (May 5, 2003), pp. 1 thru 7, 32 thru 40, 110 thru 117, 163 thru 174, 227 thru 236, 306 thru 309, 313, 318 thru 322 and 345 thru 349.

European Commission, Institute for Prospective Technological Studies, "Biometrics at the Frontiers: Assessing the Impact on Society," Technical Report EUR 21585 EN (Feb. 2005), pp. 33 thru 36, 41 thru 64, and 85 thru 101.

M. Breedt, "Integrating biometric authentication into multiple applications," MSCS Thesis, Univ. of Pretoria (Oct. 2005), pp. 39 thru 54, 98 thru 110 and 120 thru 125.

B.P. Bruno, "Secure Mobile Device Integration for Automotive Telematics," BS Dissertation, Univ. Of Tasmania (Nov. 2005), pp. 11, 22, 33 thru 36, 49 thru 51 and 60 thru 66.

Elftmann, "Secure Alternative to Password-based Authentication Mechanisms," Dipl. Thesis RWTH Aachen Univ. (Oct. 2006), pp. 13 thru 15, 39 thru 43 and 65 thru 67.

M. Olden, "Biometric Authentication and Authorisation Infrastructures," Dissertation, Universitat Regensburg (Oct. 21, 2008), pp. 3 thru 15, 29 thru 54, 128 thru 134 and 164 thru 190.

W.B. Fain, "A study of accessibility and potential design solutions for designers, procurement officials, and consumers," Georgia Tech Research Institute Accessibility Monograph Series, #5 Point of Sale Machines (Jun. 2009) (cited as background on effect of disability on accessibility to devices, no other ).

Manresa Yee, "Advanced and natural interaction system for motion-impaired users," Ph.D Thesis, Universitat de les Illes Balears (Jun. 2009), pp. ix thru x (cited as general background on problems of mobility impaired users).

A. De Luca, "Designing Usable and Secure Authentication Mechanism for Public Spaces," Dissertation, Ludwig-Maximilians-Universität München (Mar. 15, 2011), pp. 1 thru 27, 52 thru 79, 109 thru 153.

* cited by examiner

HAND-HELD USER-AWARE SECURITY DEVICE

FIELD OF THE INVENTION

This application generally relates to security and, more particularly, to secure user authentication.

BACKGROUND

Existing security systems are varied and, in many cases, easily bypassed or defeated. For example, it is not unusual for people to carry various different cards or devices to gain access to different locations or consummate transactions at various devices. Still further, people are notoriously bad at selecting security passwords that are easy to remember and hard to guess or defeat. Moreover, even where good passwords are used, it is possible to obtain a user's password through observation, keystroke capture, etc. and it is not unusual for users to be signed on to a secure system and then leave without logging out, (intentionally or unintentionally) relying upon inactivity to trigger logging out.

For people with physical limitations, whether involving problems with vision, hearing, mobility or dexterity, conforming to typical authentication protocols can be difficult or frustrating. Newer computers and smart phones have made it easier for people with limitations to perform certain actions, but they generally still rely upon whatever security system is in place for the device with which the user will interact. Thus, a visually impaired person can rely upon speech to text conversion to input a password, for example, but in such cases, security is generally lessened, not heightened.

Finally, in general, the type of authentication used for any given device tends to be universally applied for all users of that particular device, for example, a password, card key, fingerprint, etc., whenever it is used.

SUMMARY

One aspect of our invention involves a mobile user-aware security device. The device includes a hand holdable form factor housing, a processor within the housing, memory within the housing coupled to the processor, the memory comprising program storage, and rule storage, the rule storage containing multiple rules. The device further includes communication protocol controls, at least one communication interface within the housing, at least one biometric sensor coupled to the housing, and at least one location awareness sensor coupled to the housing. The program storage contains computer programming which, when executed by the processor, will allow the user-aware security device to communicate with an external device. The program storage further contains computer programming which, when executed by the processor, will analyze biometric information obtained via the at least one biometric sensor and determine whether a match exists between the biometric information and corresponding, user-specific, biometric information and return an identity result. The program storage additionally contains programming which, when executed by the processor, will allow the user-aware security device to analyze location/situation information obtained via the at least one location awareness sensor and generate location security awareness result information. Finally, the program storage contains programming which, when executed by the processor, will apply at least one rule from the rule storage, to the identity result and location security awareness result information to determine whether interaction with the external device should occur via the communication interface.

Another aspect of our invention involves a method, performed by a mobile, user-aware security device. The method involves receiving within the user-aware security device, an indication from a user that an interaction with an external device is to occur via a communication interface of the user-aware security device, executing computer programming, using a processor within the user-aware security device, to cause an: i) analyzing of biometric information obtained via at least one biometric sensor of the user-aware security device and determine whether a match exists between the biometric information and corresponding, user-specific, biometric information and return an identity result, ii) analyzing of location/situation information obtained via the at least one location awareness sensor and generate location security awareness result information, and iii) applying of at least one rule from the rule storage, to the identity result and location security awareness result information to obtain an authorization result which will specify whether interaction with the external device should occur via the communication interface and, if, the authorization result is a positive result, causing the user-aware security device to communicate with and the external device according to a specified protocol.

The advantages and features described herein are a few of the many advantages and features available from representative embodiments and are presented only to assist in understanding the invention. It should be understood that they are not to be considered limitations on the invention as defined by the claims, or limitations on equivalents to the claims. For instance, some of these advantages are mutually contradictory, in that they cannot be simultaneously present in a single embodiment. Similarly, some advantages are applicable to one aspect of the invention, and inapplicable to others. Thus, this summary of features and advantages should not be considered dispositive in determining equivalence. Additional features and advantages of the invention will become apparent in the following description, from the drawings, and from the claims.

DETAILED DESCRIPTION

In simplified overview, we have devised a device and method that can be used to provide for various levels of security authentication of a user based upon stored rules using a combination of biometric and other information that significantly increases the probability that the user is who they purport to be. In addition, the device and method is configured such that it can readily be used by a person with lessened dexterity, mobility, vision, hearing or other decreased physical capacity.

Advantageously, a device according to our approach allows the user to securely interact with many different types of external devices using a common and comfortable interface with security authorization being performed in a passive manner, an active manner or some combination thereof, depending upon the particular needs and circumstances. Still further, through use of the stored rules, the device itself can adapt to different situations and require different levels of user authentication for the same action taken at different places, different times of day, or in a manner outside the ordinary (i.e. it can be contextually varied).

Still further, the device can be configured so that it can ascertain the appropriate protocol to use for communication with a previously un-encountered external device.

Moreover, because the device and rules stand between the user and the external device, a different level of interaction can be applied to each. For example, the device can be configured to automatically sign on to an external device and change the password required for the user to access that device on a regular basis and can provide a password that is stronger or would be relatively impossible for the user to remember. When the user wants to access that external device, the appropriate level of security can be applied to authenticate the user to their own device, and then, if the user is properly authenticated, the user's device can provide the impossibly strong or long password authentication to the external device.

Figure 1:
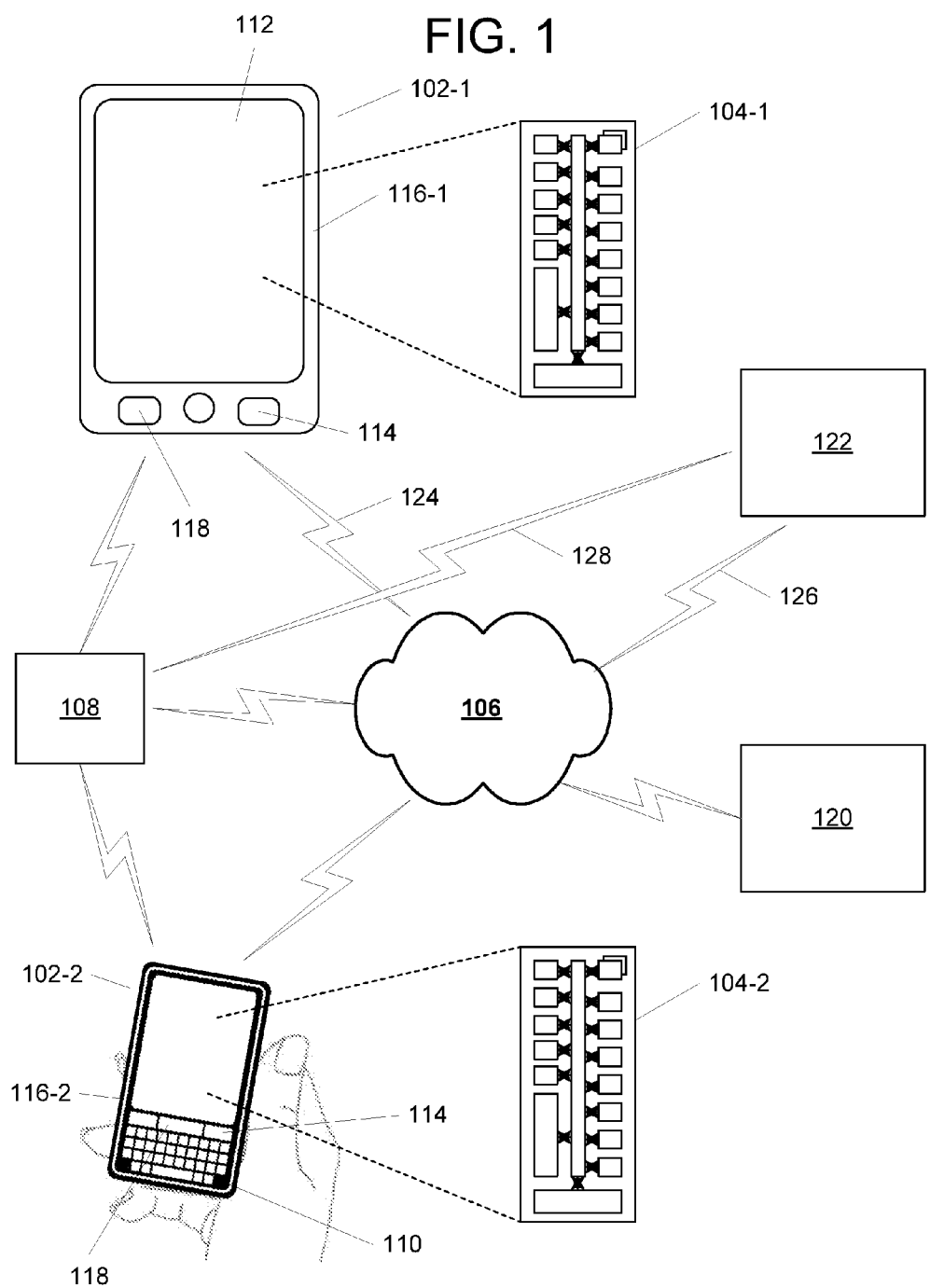
FIG. 1 illustrates, in simplified form, representative examples of mobile user-aware security suitable for use according to one variant of our approach.

FIG. 1 illustrates, in simplified form, representative examples of mobile user-aware security devices 102-1, 102-2 suitable for use according to one variant of our approach. For purposes of illustration, two different variants of the device 102-1, 102-2 have been shown as a smart cellular telephone 102-1 and a lightweight (i.e. under about 2 lbs) tablet computer (also known as a slate computer) device 102-2, although the approach can be deployed in a variety of other, different types of portable devices having a housing of a hand holdable form factor, for example, personal digital assistance (PDAs), key fobs, smart cards, personal audio and/or video systems, devices solely and specifically for the herein-described purpose, and wearable devices. As used herein, by hand holdable form factor, we generally mean a mobile device typically having a length of about 11 inches or less, a width of about 11 inches or less, and an average overall thickness of about 1 inch or less, that is easily carried. Other examples of hand holdable form factors are devices in the shape of or conforming to, for example, the following known cellular telephone or smart phone form factors: a bar, slab, block, candybar, slate, tablet, clamshell, flip or swivel form factor.

The devices are used to connect to an external device, via communication link which may be wireless or wired, depending upon the particular external device and variant device being used. Depending upon the particular situation, the connection to the external device can be direct or via a network. In addition, in some cases, the interaction with the external device can be "apparent" in that, to the user and their device, it may appear as if the user is interacting with the external device, the user may actually be interacting through some form of bypass approach as described herein. Finally, variants of the devices can be configured to interact with a remote secure computing device in order to accomplish variants of the approach described herein.

As illustrated in simplified fashion in FIG. 1, device comprises a number of components within, on or closely associated with its housing. Specifically, those components will include (physically or functionally), a processor, which may physically comprise one or more general purpose or special purpose microprocessors, to control the overall operation of the device. A communication subsystem through which communication functions, including data and voice communications, are performed. For example, the communication subsystem can generally be configured to send and receive messages to/from a wireless network 106, for example a cellular telephone network implemented in accordance with, for example, any of the Global System for Mobile Communication (GSM), General Packet Radio Services (GPRS), Enhanced Data GSM Environment (EDGE) and/or Universal Mobile Telecommunications Service (UMTS) networks and standards, third-generation (3G) and fourth-generation (4G and 4G LTE) networks and standards, as well as future standards and networks which may be deployed.

As further represented in simplified fashion in FIG. 1, each device 102-1, 102-2 is configured with various components 104-1, 104-2, which may be hardware, software or some combination thereof, which are used to implement the approach described herein. In that regard, in general, variant devices used for our approach, examples of which are shown in FIG. 1, inherently include a communication interface by which the device communicates wirelessly to a cellular telephone network 106 and also one or more other communication interfaces, such as short range, short wavelength or high frequency radio frequency (RF), infrared (IR), Braille, optical display or link, audio speaker or physically movable/manipulable device (like a robotic gripper or linkage that can be a surrogate for required user dexterity) to interact or communicate (directly or indirectly) with some external device 108. For purposes of illustration, one of the illustrated devices 102-1 includes the capability to communicate according to the Bluetooth standard as well as having an IR interface, whereas the other device 102-2 includes the capability to communicate via a Braille interface and an optical link. Each device also includes a convenient display that is normally used to display information in the conventional manner of smart phones and tablet PCs. In addition, with some variants, in lieu of a keyboard 110 the display can serve as an input device, for example, if it is a touch screen type display 112. The device 102-1, 102-2 also includes a microphone as part of or within its housing for audio input and a speaker or port for connection of an external earpiece or speaker for audio output.

In addition, each device is configured with components that can function as at least one biometric sensor 114. For example, a high resolution camera or sensor that can be used to obtain biometric information from the user, such as a scan of at least a portion of a user's face, iris, retina, blood flow, blood vessel pattern or hand. In addition, or alternatively, a specific fingerprint sensor can separately be incorporated into the device, such as into a surface of the housing 116-1, 116-2 of the device 102-1, 102-2 where it is easily located for fingerprint reading. Alternative or additional biometric sensors 114 can be included on or within the housing are a visible light scanner or IR scanner that can be used to provide more accurate or detailed scans of the user or a multi-modal sensor that can be used for acquiring multiple different types of biometric information. Additionally or alternatively, the microphone can also be used as a form of biometric sensor for purposes of voice/speech recognition or voice print acquisition. The biometric sensor(s) 114 supply biometric data to a biometric input handler which, as part of a biometric sensor subsystem, prepares the information for rule application.

The device is also configured with components that can function as at least one location awareness sensor 118. For example, the at least one location awareness sensor 118 can be a camera of the device 102-1, 102-2 that can be used to acquire information about the physical location or current situational status through acquired images, the microphone of the device 102-1, 102-2 can be used to acquire audio from not only the user, but other surrounding and/or background sounds. Additionally, for location/situation awareness, the device 102-1, 102-2 can be configured with a global positioning satellite (GPS) receiver within the housing 116-1, 116-2 or to otherwise internally perform assisted GPS in a known manner to acquire physical location information.

Finally, the devices are configured with stored rules that are applied to some combination of acquired or derived biometric and location/situation information in order to authenticate that the user is who they purport to be and, if they are, allow subsequent interaction with an external device and, if not, either because the user is an imposter or the situation indicates a potential problem, appropriate action can be taken. Specifically, each device includes rules that are used to perform authentication of a user to an external device 108 through different levels of user-specific security before authenticating the user to the external device 108 so that interaction with the external device, for example, an automated teller machine (ATM), a point of sale (PoS) device, a specific lock to gain entry into a controlled area, a specified computer, etc., will be allowed. In addition, as explained in greater detail herein, the rules can be configured to be modified over time to "learn" user activities and trigger different actions or levels of security as a result.

Note however that, while FIG. 1 suggests that the principal components will be embedded in a device 102-1, 102-2 as described herein, aspects of the approach described herein can be adapted so that portions of the authentication, analysis or rule application process can take place in, or in conjunction with, one or more other secure remote systems 120. Similarly, it will be appreciated form the description below that, in some cases, the apparent direct interaction between the user's device 102-1 and the external device 108 may actually involve connection to an alternative external device 122, via communication links 124, 126 which will interact with the external device 108 via some other communication link 128 between the two 108, 120.

Figure 2:
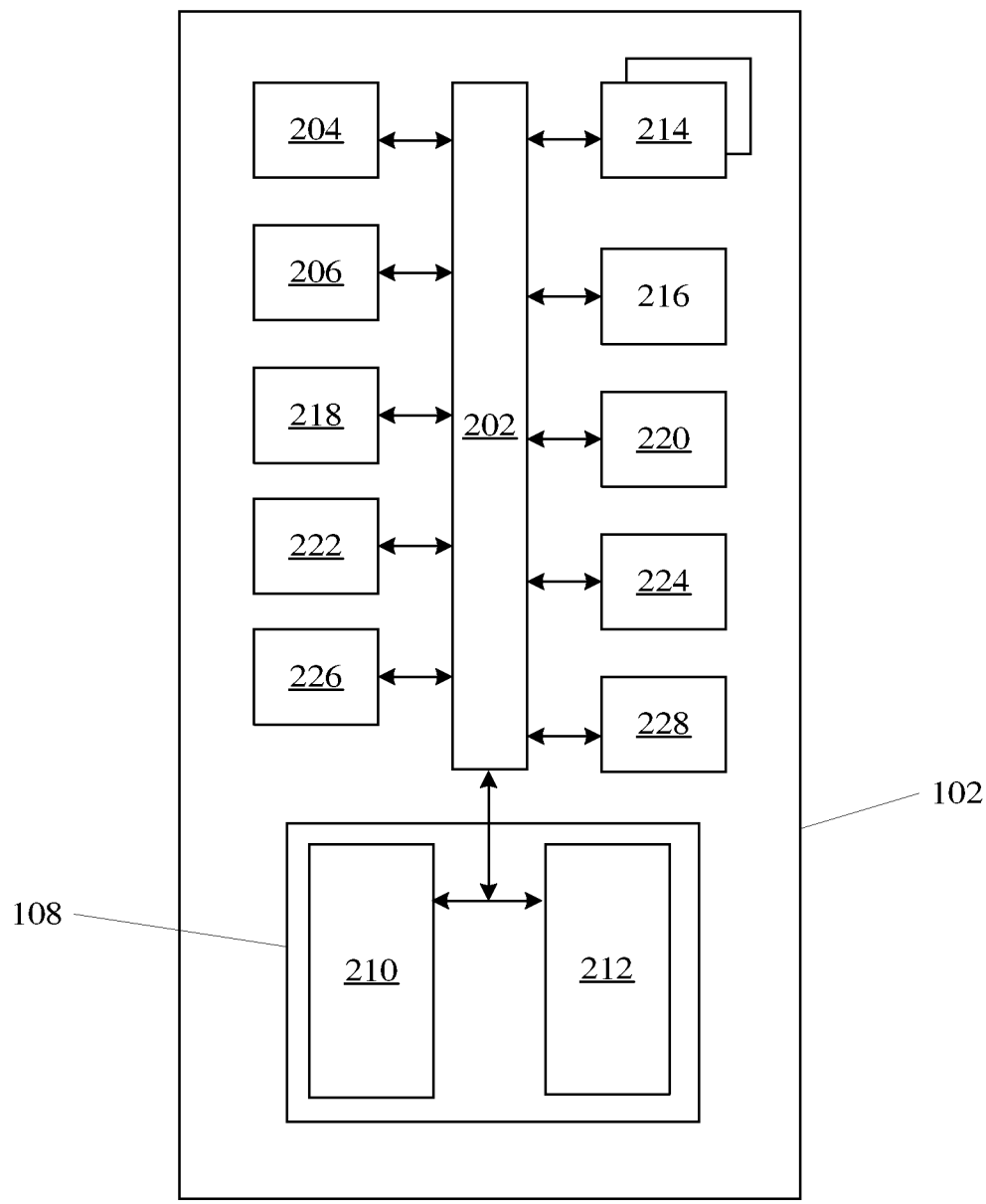
FIG. 2 illustrates, in simplified form but greater detail, representations of the various physical and/or functional components of one variant of a device of FIG. 1.

FIG. 2 illustrates, in simplified form but greater detail, representations of the various physical and/or functional components of one variant of a device of FIG. 1.

Specifically, FIG. 2 illustrates a detailed example of one embodiment of a user-aware security device 102, for example as shown in FIG. 1. As shown, the device 102 comprises a processor 202, a display sub-system 204 and a wireless network communication subsystem 206 for two-way communications with a wireless network. According to one variant embodiment, the communication subsystem 206 includes antennas, transceivers and signal processing capabilities. The communication subsystem 206 represents one or more different Radio Frequency (RF) channels, operating according to defined protocols specified for those communications and which can be capable of supporting circuit switched and/or packet switched data in accordance therewith. In addition, the device can be configured to identify and select from among various communication protocols as needed.

The processor 202 is suitably programmed to control the overall operation and functions of the device as described in more detail below.

The device further includes memory 208, which may include, for example, flash memory, a random access memory (RAM), read-only memory (ROM) which is functionally broken up into program storage 210 and rule storage 212. The device further includes a user-centric input/output (I/O) sub-system 214 (e.g., a keyboard, scroll wheel, trackball, joystick, directional-pad, touch-screen or other input/navigational component), at least one biometric sensor subsystem 216, at least one location/situation sensor subsystem 218, a speaker 220, a microphone 222, a mobile device short-range communications subsystem 224 comprising, for example, an infrared transceiver, wireless bus protocol system, such as Bluetooth, and/or other components to implement short wavelength or high frequency local wireless communications. The short-range communications subsystem 224 provides for communication between the device and different systems or devices, without the use of network. For example, the subsystem 224 may include an infrared device and associated circuits and components for short-range communication according to, for example, standards developed by the Infrared Data Association (IrDA), Bluetooth, and the 802.11 family of standards developed by IEEE, top name a few.

In addition, the device may optionally include other interfaces, for example, a serial port 226 (such as a Universal Serial Bus (USB) port) through which other functions of the device can be accomplished.

Still further, in the case of a device variant configured for cellular voice and data communications, the device may also include a SIM (Subscriber Identity Module) 228 card that can be used to augment the approaches described herein.

The processor 202 operates under stored program control (i.e. an operating system), typically contained in non-volatile memory, to execute programs that specify or facilitate the functions or tasks to be accomplished. Stored program control includes applications, code components and/or software modules that control device operation. The processor may also execute other programs or software applications stored in the program storage for ancillary tasks, for example, games, word processors, spreadsheets, a web browser, e-mail client, or other program or application. In addition, the processor executes program code that formats and analyzes biometric and location/situation information received from the sensors 216, 218 as well as executing program code to implement and apply the rules and, in some variants, to "learn" patterns of user activity that can be included as part of either the location/situation analysis, the rules analysis, or both.

In operation, the biometric sensor(s) 114 is used to acquire biometric information in a known manner for processing by the biometric sensor subsystem 216 to determine if the appropriate degree of match between the acquired information and stored biometric information, also in a known manner. Depending upon the variant implementation, if a match does not exist, the user can be prompted to retry one or more times. At some point, if a match does not exist, a biometric mismatch condition can be indicated, for example, in one simple case, by setting or clearing a flag or bit location in memory designated for that sensor result, or in more complicated cases, through use of specific error codes or conditions that indicate the specific sensor(s) and the kind/type of failure, particularly where different degrees of match can be specified.

The at least one location awareness sensor 118 and its associated at least one location/situation sensor subsystem 218 are less conventional and operate to ascertain the location and/or "situation" surrounding the device 102 and its user at the time authentication is required to enhance the probability that (i) the user is who they purport to be and (ii) the user's situation is such that the authentication should be allowed to proceed.

For example, if authentication for a transaction at a bank ATM is requested, GPS information can be used to ascertain if the device is, in fact, at the designated ATM machine or somewhere else. Similarly, a location awareness sensor 118 can be used, under the guise of doing a facial recognition, to recognize if there is another fact along side or behind the user which might be indicative of a withdrawal being made under duress. In like manner, an infrared scanner can be used to detect a heat signature or similar detail and/or the camera can be used to detect the user's blinking or other involuntary facial movement so that an attempt to fool the device 102 using a picture can be thwarted. Still further, the device can be configured to recognize or match against stored information, aspects of the user that are much more difficult to fake, for example, handwriting, a specific facial expression (smile, frown, surprise or detailed mouth position when saying a letter or word), a distinctive scar, birthmark or other unique feature and, more importantly, do so in a manner not readily detectable by an unauthorized user. Similarly, the location/situation sensor subsystem 218 can be used to acquire, through audio, information indicating that there are multiple people present, possibly outside the field of view of the device camera, who may be causing the user to make the withdrawal under duress.

Advantageously, location/situation awareness is highly flexible in that the ability and type of information that can be acquired for use in applying the rules as described herein is only limited by the available sensor(s) 118 and the implementer's imagination.

In general, the device is operates under program control to make it easy for the user to use and can readily accommodate users with physical infirmities because numerous different modes of ascertaining identity can be employed that do not need use of, for example, a certain level of dexterity to type in passwords or physically interact with the external device. audio for someone with hearing problems, visual display for someone with visual problems, etc. Moreover, with our approach, negative authentication can be employed. For example, the device can attempt to authenticate the user by requesting an action the user cannot do, for example, a person with impaired dexterity can be presented with a challenge that they knowingly cannot complete, like touching different parts of a touch screen at different times, or a person with diminished or lost speaking ability due to a stroke could be asked to speak a phrase, so that if the task is correctly carried out, authentication should fail and a failure to complete the task would be considered a positive authentication result.

All of the above is governed by application of one or more rules stored on the device in the rules storage.

Rules are the way that the device determines an appropriate level of security to apply and obtains and analyzes information to determine whether interaction with a specific external device should proceed. The rules specify what information should be obtained via which sensor(s) under the specified security level, what would constitute proper authentication based upon that information, a specification of what should happen, and/or how the device should act, upon a failure to authenticate (and in some cases, the action itself), what should be provided to the external device to authenticate the user to the external device (and in some variants may actually carry out that authentication interaction and possibly even control the interaction itself).

In addition, in some cases, the rules can cause the sensors obtain certain information without any knowledge or interaction with the user, for example, time date information, location using GPS, streaming audio or video, etc.

Note that, depending upon the particular implementation, the rules in an individual device can be pre-specified, defined by the user or some specified person in a custom manner for the user and, in some implementations, modified after acquisition by/for the user.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with a processor.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages or processor understandable code (operation codes and arguments), including an object oriented programming language such as Java, Smalltalk, C++ or the like and conventional procedural programming languages, such as the "C" programming language or similar programming languages. The program code may execute entirely on the user's device or partly on the user's device In addition, remote external devices may be connected via any type of network, including a local area network (LAN) or a wide area network (WAN), or communication link and as well as through the Internet using an Internet Service Provider.

Aspects of the present invention are now described below with reference to flowchart illustrations. It will be understood that each block of the flowchart illustrations and/or block diagrams, and combinations of blocks in the flowchart illustrations and/or block diagrams, will be implemented by computer program instructions. These computer program instructions will be provided to the processor, such that the instructions, which execute via the processor create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, concurrently or in an interleaved fashion, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 3:
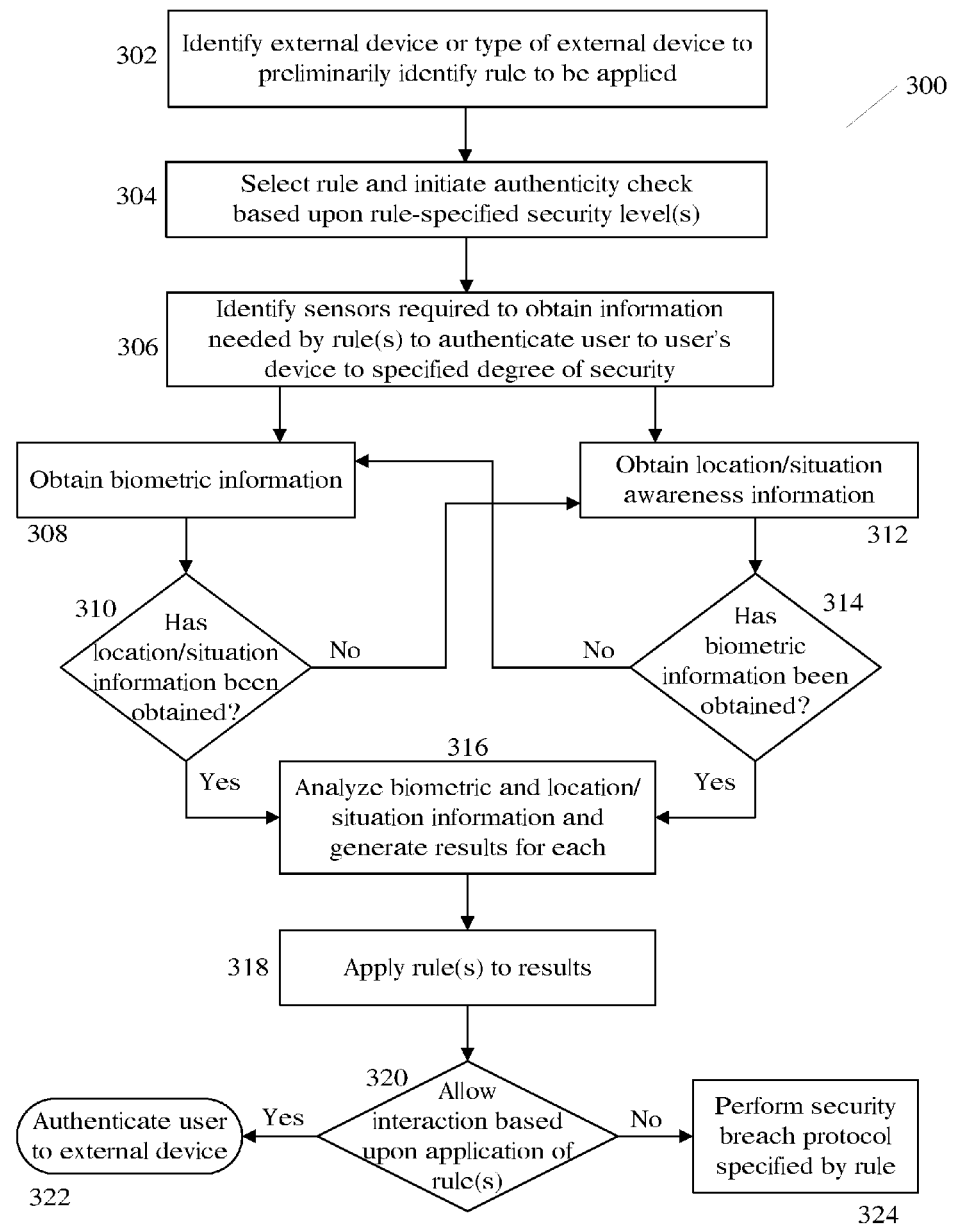
FIG. 3 illustrates, in simplified form, a flowchart for the process by which the approach herein is accomplished.

With the foregoing in mind, FIG. 3 illustrates, in simplified form, a flowchart for the process by which the approach herein is accomplished.

The process begins as follows, under program control involving the processor and stored programming in the device 102. First, the user indicates on their device 102 an intent to interact with a specific external device 108, such as an ATM, a particular lock or other access control device, a kiosk to purchase tickets for some activity, etc., for example, by selecting an icon on the display, depressing a key, or merely bringing the device 102 with a specified proximity of the external device 108 (Step 302).

Advantageously, if the external device 108 is not already known to the user's device 102, the user's device can be configured with software to attempt to recognize the type of external device 108 and mediate with the external device to ascertain what form of communication protocol is available for communication, using, for example, a sequential "try and see" approach, or by concurrently trying multiple initial communication methods and/or protocols in a handshaking fashion, seeing what type of approach yields a valid response and then mediating the connection via that approach.

Based upon the user's action and/or the particular type of external device 108, under program control, a rule is selected from the rule storage and an authenticity check is initiated as specified or defined by the rule at the designated security level (Step 304).

Next, the appropriate sensors 114, 118 required to obtain the information needed by the rule(s) to authenticate user to user's device to specified degree of security are identified (Step 306).

Sequentially, concurrently, or in an interleaved fashion as appropriate, the biometric sensor(s) 114, in conjunction with the biometric sensor subsystem 216 (of which they are a part), are used to acquire the appropriate biometric information and either compare it with stored "known good" biometric information for the user or communicate with some external computer to perform that aspect of authentication (Step 308). And the location awareness sensor(s) 118 in conjunction with the location/situation sensor subsystem 218 (of which they are a part) are used to ascertain the location/situation surrounding that particular use of the device 102 (Step 312). This continues (Step 310, Step 314) until all of the necessary information specified by the rule has been obtained.

As a digression, at this point it is worth reiterating that, for specific implementations, particular individual physical devices, for example the camera or microphone, could be part of both the sensor subsystem 216 and the location/situation sensor subsystem 218.

When all the required information has been acquired in accordance with the rule, it then analyzed and one or more results of that analysis may be generated (Step 316). For example, positive match of a fingerprint scan, IR scan of the user's face to determine the user is a living human and a voice print match may be indicated as a result of the biometric analysis. Similarly, as determined by the location/situation subsystem, the GPS may indicate the user is at an ATM of a bank with which the user has an account, the time is mid-afternoon on a weekday, the camera scan identifies a normal facial expression of the user and no other faces in view when the user holds their device 102 at arms length and pivots it with a scanning motion so that, first one shoulder of the user is centered in the display and then the camera is slowly swiveled until the user's other shoulder is centered in the display. Alternatively, implementations can allow for rule to be conditional so that, for example, an attempt to access the same ATM in the same location will require a higher level or more authentication information to be acquired and analyzed at 3 o'clock in the morning than at 4:30 in the afternoon on the last weekday of a month.

Once the analysis is complete, the rule is applied in appropriate combination to the results of the analysis (Step 318). In this manner, different levels of security can be applied as specified in the rule. So, for example, if the same information acquired in the preceding paragraph but the GPS indicated that the user was in their home (i.e. doing home banking), the rule might allow for the date/time to be any day of the week and any time between 6 am and midnight, whereas, at an ATM, it might provide for a narrower window of time. Similarly, if the GPS indicates that the user was at home, the rule might ignore an indication of other faces or people nearby.

As a result of the application of the rule to the results, the user's device can determine whether the interaction with the external device 108 is to be allowed (Step 320). If the interaction is to be allowed, the user can then be authenticated to the external device (Step 322). If not, a security breach protocol is be invoked (Step 324).

Based upon the foregoing, it should now be appreciated that devices implementing variants of the invention described herein can provide significant advantages. For example, it becomes possible for the device to recognize not only the type of device to be interacted with, but ascertain aspects of the situation surrounding that intended interaction and take different actions as a result.

It also becomes possible for the device to know that the user is who they purport to be to a high degree of probability.

It is possible for the device to know multiple protocols so that it can interact in a similar manner with a variety of external devices while still applying the rules to ensure appropriate security exists and to automate log on to devices in a more secure manner because it can establish and use passwords of a randomness or strength that that a user never reasonably could.

It further can use known technologies in various combinations to obtain a higher combined probable identification while minimizing intrusion or time and, more importantly, more easily defeat attempts to "fool" the device through artificial fingerprints, photographs, masks, etc. as well as being able to detect the presence or others or conditions warranting further scrutiny.

In this regard, a further optional enhancement to the foregoing can be readily added—an ability to "learn" usage patterns over time and incorporate them into the rules. Thus, for example, the system can maintain a log (in known manner) into which locations and times of user interactions with particular external devices occur. The rules can take that logged information into account in applying the rule. For example, most people are creatures of habit and tend to follow certain patterns. Thus, a user who gets paid every month on the weekday on or before 15th and last day of each month and, thus, goes to the ATM of their local branch at 6 o'clock in the evening on that day or between 10 o'clock in the morning and noon on the next day more than 90% of the time over a period of a year or more, can reasonably be expected to continue that practice. As a result, recordation of that information can allow the device to recognize an attempt to use that ATM on a Sunday at 5 o'clock in the morning as unusual and boost the level of authentication information required as a result. Similarly, the device can learn, through GPS information and corresponding external device access history (acquired over time), that an interaction with a PoS terminal at a gas station in a high crime neighborhood that is 100 miles away from any location the user has previously ever been to should result in a higher level of authentication scrutiny being applied.

Similarly, the rules can optionally be configured such that, even once authenticated, attempts to use the device in a manner inconsistent with known usage patters can trigger a requirement for further authorization or a security breach protocol. For example, if the user's transaction history indicates gasoline purchase authorizations in amounts under $65, an attempt to authorize a transaction for gasoline for a similar amount 5 minutes later or for a significantly higher amount might trigger additional authorization before the device will allow the transaction to be consummated with the external device or a security breach protocol.

Still further, to great advantage, the rules can optionally be configured such that different security breach protocols can be triggered upon a failure. For example, in the event of a failure, the rules can trigger the device to simulate a failure of one of its components so that the transaction can not proceed (i.e. triggering a "low battery" warning and shut down, signaling a communication failure, causing all or part of the display to go black or become pixelated or distorted). Additionally, or alternatively, the device can be configured to communicate an alert to a designated alert entity without notifying or being evident to the user (for example, by calling 911 or a designated phone number and transmitting a prerecorded alert message), trigger a camera associated with the external device to obtain a picture of the (likely false) user, trigger streaming of video, audio or both to a designated entity or site (for example, a special website), initiate GPS tracking of the device, or some combination of the above (for example, calling 911 and providing a canned message to the effect "this may be an emergency situation involving a disabled person. An unusual ATM transaction is underway and there is an indication that the user is under duress. The GPS location of the device is <location> and live audio and video feed from the user's camera has been automatically turned on and is being streamed to <online location> for viewing and where it will be stored." In this manner, for example, a user who has been kidnapped can be located, the safety threat level can be remotely assessed and the kidnapper(s) can surreptitiously viewed, identified and evidence can be gathered and preserved.

As will be appreciated, our approach applies aspects of known techniques, for example biometric authentication, facial recognition, in conjunction with existing devices, such as smart phone and tablet computers and their common components like cameras, displays, microphones, multi-protocol communication capability, etc. to advantageous effect. For brevity, U.S. Pat. No. 6,983,882 and U.S. Pat. Pub. Nos. 2004/0218451, 2005/0273626, 2005/0030939, 2007/0245158, 2007/0155366, 2009/0327131, 2009/0204815, 2009/0327144, 2009/0119742, 2010/0291909, 2010/0215223, are incorporated herein by reference in their entirety as if fully set forth herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any and all means or step plus function elements in the claims are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It should be understood that the description (including the figures) is only representative of some illustrative embodiments. For the convenience of the reader, the above description has focused on a representative sample of all possible embodiments, a sample that teaches the principles of the invention. The description has not attempted to exhaustively enumerate all possible variations. That alternate embodiments may not have been presented for a specific portion of the invention, or that further undescribed alternate embodiments may be available for a portion, is not to be considered a disclaimer of those alternate embodiments. One of ordinary skill will appreciate that many of those undescribed embodiments incorporate the same principles of the invention as claimed and others are equivalent.

What is claimed is:

1. A mobile user-aware security device comprising:
a hand holdable form factor housing,
a processor within the housing,
memory within the housing coupled to the processor, the memory comprising program storage, and rule storage, the rule storage containing multiple rules, the rules collectively specifying (i) information to be obtained via sensors under a specified security level, (ii) specific sensors to be used to obtain the information, (iii) what would constitute proper authentication for use of the mobile user-aware security device to interact with an external device, and (iv) what should be provided to the external device to authenticate the user to the external device;
communication protocol controls which are used to negotiate with the external device what particular communication protocol is to be used to interact with the external device;
at least one communication interface within the housing;
at least one biometric sensor coupled to the housing;
at least one location awareness sensor coupled to the housing;
the program storage containing first computer programming which, when executed by the processor, will allow the user-aware security device to communicate with the external device;
the program storage further containing second computer programming which, when executed by the processor, will analyze biometric information obtained via the at least one biometric sensor in accordance with at least one of the rules in the rule storage and determine whether a match exists between the biometric information and corresponding, user-specific, biometric information and return an identity result;
the program storage further containing third programming which, when executed by the processor, will allow the user-aware security device to, in accordance with at least one of the rules in the rule storage, analyze location/situation information obtained via the at least one location awareness sensor and generate location security awareness result information; and
the program storage further containing fourth programming which, when executed by the processor, will apply at least one rule from the rule storage, to a combination of the identity result and location security awareness result information to determine whether authentication is positive and, thus, interaction with the external device should occur via the communication interface.

2. The user-aware security device of claim 1, wherein the at least one location awareness sensor comprises at least one of:
a camera, a microphone, or a global positioning satellite (GPS) receiver.

3. The user-aware security device of claim 1, wherein the at least one biometric sensor comprises at least one of:
a fingerprint sensor, an iris scanner, a retina scanner, a blood flow sensor, a writing scanner, a voice sensor, a face scanner, a hand portion scanner, a visible light sensitive scanner, an infrared (IR) sensitive scanner or a multi-modal sensor.

4. The user-aware security device of claim 3, wherein the at least one location awareness sensor comprises at least one of:
a camera, a microphone, or a global positioning satellite (GPS) receiver.

5. The user-aware security device of claim 1, wherein the at least one communication interface comprises at least one of:
a cellular telephone communication interface, an IR communication interface, a short wavelength radio signal interface, a high frequency radio signal interface, a Braille interface, an optical display or link, an audio speaker or a physical manipulation interface.

6. The user-aware security device of claim 5, further comprising:
at least one of: a camera, a microphone, a global positioning satellite (GPS) receiver, or assisted GPS location determination capability; and
at least one of: a fingerprint sensor, an iris scanner, a retina scanner, a writing scanner, a voice sensor, a face scanner, a hand portion scanner, a visible light sensitive scanner, an infrared (IR) sensitive scanner or a multi-modal sensor.

7. The user-aware security device of claim 1, wherein the hand holdable form factor housing has dimensions of less than about 11 inches in length and width by about 1 inch in average thickness and weighs less than 2 pounds.

8. The user-aware security device of claim 7, wherein the hand holdable form factor housing comprises:
a bar, slab, block, candybar, slate, tablet, clamshell, flip or swivel form factor smart phone.

9. The user-aware security device of claim 1, wherein the program storage further includes alarm action programming which will cause a specific action to be taken by the user-aware security device when an alarm rule is triggered as a result of the application of the at least one rule to the identity result and location security awareness result information.

10. The user-aware security device of claim 1, further comprising a user interface, wherein the user interface includes at least one of a touch screen or keyboard.

11. A method, performed by a mobile, user-aware security device comprising:
receiving within the user-aware security device, an indication from a user that an interaction with an external device is to occur via a communication interface of the user-aware security device;
executing computer programming, using a processor within the user-aware security device, to obtain information according to at least one rule using one or more sensors, the at least one rule specifying (i) information to be obtained via sensors under a specified security level, (ii) specific sensors to be used to obtain the information, (iii) what would constitute proper authentication for use of the user-aware security device to interact with an external device, and (iv) what should be provided to the external device to authenticate the user to the external device, the at least one rule being and, in accordance with the at least one rule stored in rule storage within the mobile, user-aware security device, to cause an:
i) analyzing of biometric information obtained via at least one biometric sensor of the user-aware security device and determine whether a match exists between the biometric information and corresponding, user-specific, biometric information and return an identity result,
ii) analyzing of location/situation information obtained via the at least one location awareness sensor and generate location security awareness result information, and
iii) applying of the at least one rule from the rule storage, to a combination of the identity result and location security awareness result information to obtain an authorization result which will specify whether interaction with the external device should occur via the communication interface; and if, the authorization result is a positive result, causing the user-aware security device to communicate with and the external device according to a specified protocol.

12. The method of claim 11, further comprising:
selecting the specified protocol from among multiple protocols based upon the external device to be communicated with.

13. The method of claim 11, further comprising:
negotiating with the external device to determine the specified protocol to use for the communication.

14. The method of claim 11 further comprising:
obtaining the biometric information using the at least one biometric sensor, wherein the biometric information comprises data indicative of at least one of: at least a portion of a specific user's fingerprint, iris, retina, handwriting, voice, facial features, or hand.

15. The method of claim 14, wherein the data is indicative of more than one of: the portion of a specific user's fingerprint, iris, retina, handwriting, voice, facial features, or hand.

16. The method of claim 11, further comprising:
based upon a combination of the external device and the location security awareness result information obtained as specified in the at least one rule, determining what should be provided to the external device to authenticate the user to the external device.

17. The method of claim 11, further comprising:
if, the authorization result is a negative result, causing the user-aware security device to follow a security breach alarm protocol.

18. The method of claim 17, wherein the security breach alarm protocol comprises one or more of:
simulating an interaction error with the external device, simulating a failure of a component of the user-aware security device, communicating an alert to a designated alert entity, triggering a camera associated with the external device, triggering a streaming of at least one of video or audio from the user-aware security device; initiating a GPS tracking of the user-aware security device, or disabling the user-aware security device.

19. The method of claim 11, further comprising:
gathering and storing pattern of activity information with respect to repeated interactions with the external device.

20. The method of claim 19, wherein one of the analyzing of location/situation information or the applying of the at least one rule further includes taking into account the pattern of activity information.

\* \* \* \* \*